(12) United States Patent
Ku et al.

(10) Patent No.: US 8,189,291 B2
(45) Date of Patent: May 29, 2012

(54) CONICAL FLUID DYNAMIC BEARINGS HAVING IMPROVED STIFFNESS FOR USE IN HARD-DISK DRIVES

(75) Inventors: Chiaoping Ku, Fremont, CA (US);
Fu-Ying Huang, San Jose, CA (US);
Lidu Huang, Danville, CA (US);
Hitoshi Shindo, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 39 days.

(21) Appl. No.: 12/910,488

(22) Filed: Oct. 22, 2010

(65) Prior Publication Data

US 2012/0099223 A1 Apr. 26, 2012

(51) Int. Cl.
*G11B 17/02* (2006.01)
(52) U.S. Cl. .................................................. 360/99.08
(58) Field of Classification Search ................ 360/99.08
See application file for complete search history.

(56) References Cited

U.S. PATENT DOCUMENTS

| | | | |
|---|---|---|---|
| 6,118,620 A | 9/2000 | Grantz et al. | |
| 6,154,339 A * | 11/2000 | Grantz et al. | 360/99.08 |
| 6,583,952 B1 * | 6/2003 | Grantz et al. | 360/99.08 |
| 6,731,456 B2 * | 5/2004 | Parsoneault et al. | 360/99.08 |
| 6,975,484 B2 * | 12/2005 | Herndon et al. | 360/99.08 |
| 7,042,125 B2 * | 5/2006 | LeBlanc et al. | 310/90 |
| 7,101,085 B2 | 9/2006 | Grantz et al. | |
| 7,193,811 B2 * | 3/2007 | Leuthold et al. | 360/99.08 |
| 7,213,972 B2 | 5/2007 | Grantz | |
| 7,390,125 B2 | 6/2008 | Kennedy et al. | |
| 7,407,327 B2 | 8/2008 | Le et al. | |
| 7,550,887 B2 * | 6/2009 | Sekii | 310/90 |
| 7,781,929 B1 * | 8/2010 | Nguyen et al. | 310/90 |
| 2003/0142889 A1 | 7/2003 | Kennedy et al. | |
| 2010/0052446 A1 | 3/2010 | Bauer | |

OTHER PUBLICATIONS

Dyanmics of a Hard Disk Drive Spindle System Due to Its Structural Design Variables and the Design Variables of Fluid Dynamic Bearings http://cat.inist.fr/?aModele=afficheN&cpsidt=22157362.
Non-contact measurement method of mechanical stiffness for high revolutionary speed precision fluid dynamic bearing rotors http://portal.acm.org/citation.cfm?id=1667007,1667035&coll=GUIDE&cdl=GUIDE&CFID=82286458&&CFTOKEN=96412077.

* cited by examiner

*Primary Examiner* — Mark Blouin
(74) *Attorney, Agent, or Firm* — Brokaw Patent Law PC; Christopher J Brokaw (57) ABSTRACT

Approaches for a fluid dynamic bearing (FDB) system for use within a hard-disk drive. A fluid dynamic bearing (FDB) system may comprise an upper conical bearing and a lower conical bearing that are both disposed along a stationary shaft on which a magnetic-recording disk is rotatably mounted. The upper conical bearing and the lower conical bearing may have different cone angles, diameters, and/or lubricants to produce a desired difference in stiffness between the first conical bearing and the second conical bearing. By adjusting characteristics of the fluid dynamic bearing (FDB) system to achieve the desired bearing stiffness ratio, the tendency for the magnetic-recording disks to experience a sustained vibration when the hard-disk drive receives a mechanical shock is reduced. By preventing the magnetic-recording disks from sustained vibration after a mechanical shock, data may be written to and read from the magnetic-recording disks with greater reliability.

18 Claims, 7 Drawing Sheets

CONICAL FLUID DYNAMIC BEARINGS HAVING IMPROVED STIFFNESS FOR USE IN HARD-DISK DRIVES

FIELD OF THE INVENTION

Embodiments of the invention relate to conical fluid dynamic bearings (FDB) in a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

As the distance between the read/write head and the surface of the magnetic-recording disk must be tightly controlled, it is desirable that the magnetic-recording disks vibrate or oscillate as little as possible. To address this concern, a tied-shaft fluid dynamic bearings (FDB) spindle motor may be used to increase the rigidity of the motor structure and to minimize, and potentially eliminate, any vibration or oscillation of the magnetic-recording disks, especially when the HDD is bumped or otherwise experiences a mechanical shock.

Figure 1:
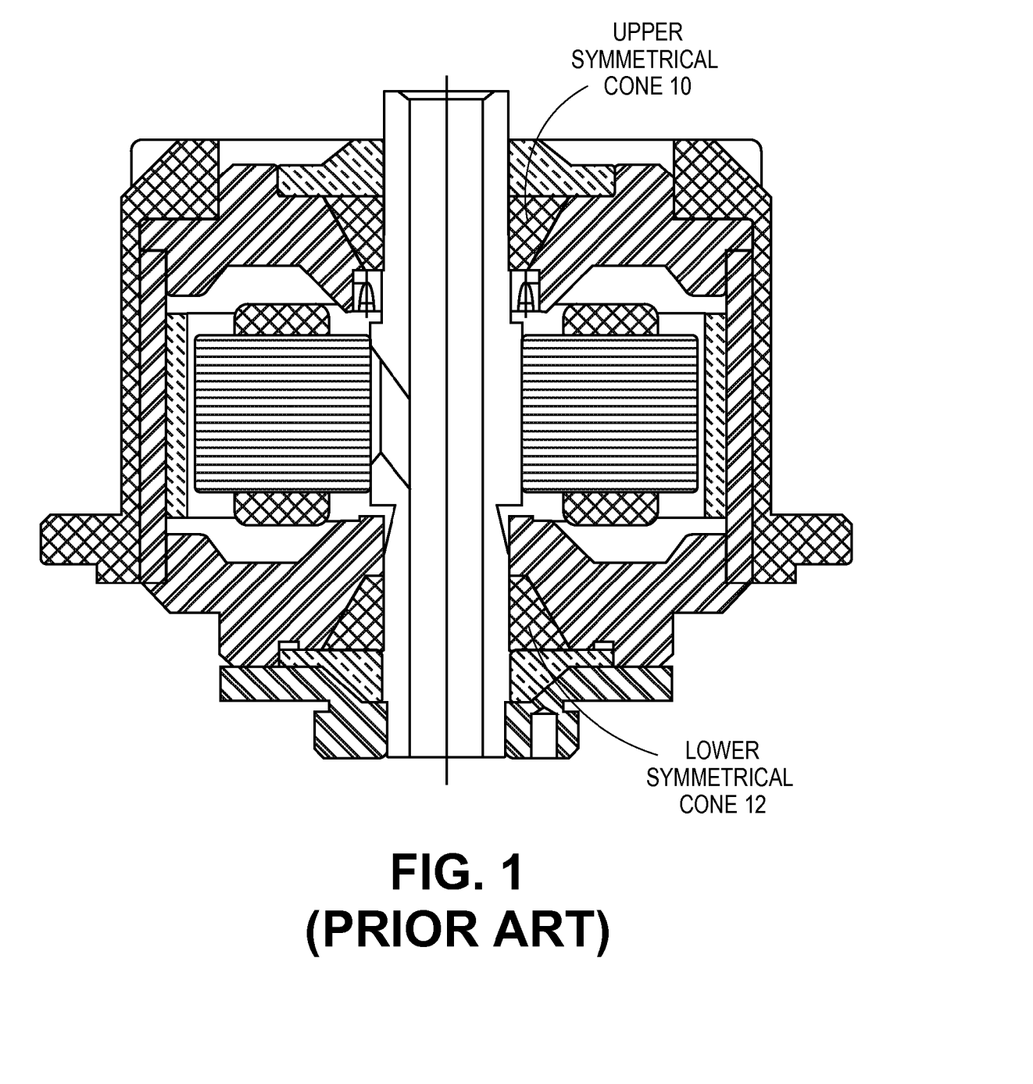
FIG. 1 illustrates a tied-shaft fluid dynamic bearing (FDB) spindle motor according to known approaches.

FIG. 1 illustrates a tied-shaft fluid dynamic bearings spindle motor according to known approaches. FIG. 1 is taken from and discussed in U.S. Pat. No. 6,118,620. As illustrated in FIG. 1, upper symmetrical cone 10 and lower symmetrical cone 12 are symmetrical and serve to stabilize the magnetic-recording disk, both when magnetic-recording disk is rotating and when the HDD is bumped or otherwise experiences a mechanical shock. The dimensions of upper symmetrical cone 10 and lower symmetrical cone 12 are designed to be the same so that upper symmetrical cone 10 and lower symmetrical cone 12 have the same bearing stiffness. If the upper symmetrical cone 10 and lower symmetrical cone 12 have the same bearing stiffness, then it is expected that any force applied to the magnetic-record disk (perhaps due to the HDD being bumped) should be equally dampened by upper symmetrical cone 10 and lower symmetrical cone 12, thereby reducing or eliminating the tendency for the magnetic-recording disk to oscillate.

SUMMARY OF THE INVENTION

It is observed that, in practice, the upper cone and the lower cone of a fluid dynamic bearing (FDB) in a hard-disk drive (HDD) may bear different amounts of weight. For example, lower symmetrical cone 12 of FIG. 1 bears more weight than upper symmetrical cone 10 as lower symmetrical cone 12 bears more of the weight of the magnetic-recording disk(s) and motor structure. As a fluid dynamic bearing bears more weight, the fluid within the bearing compresses, thereby causing the bearing to become stiffer. As a result, when a HDD is oriented as shown in FIG. 1, lower symmetrical cone 12 will have a higher bearing stiffness than upper symmetrical cone 10, even though upper symmetrical cone 10 and lower symmetrical cone 12 have the same or substantially similar dimensions. The bearing stiffness between upper symmetrical cone 10 and lower symmetrical cone 12 may differ around 10% due to the disparity in how much weight is born by each bearing. FDB systems with symmetric cone designs can generally accommodate this disparity in stiffness between the upper and lower cones.

However, certain spindle motors may require FDB designs that support a larger disparity in bearing stiffness (for example, a 200% difference) between the upper and lower conical bearings. This need may arise due to an uncertainty in how much external force each conical bearing will eventually bear (which may be compounded because it may be unknown how the HDD will be oriented in the field). A FDB system with a symmetric or substantially symmetrical conical bearing design may not be able to accommodate such difference in the bearing stiffness between the upper and lower conical bearings. Also, as the form factor of HDDs becomes smaller and more compact, the space limitations within the HDD may render the use of symmetrical conical bearings impractical or impossible.

Embodiments of the invention provide for a fluid dynamic bearing (FDB) system that supports a greater range of difference in the bearing stiffness between the conical bearings of the FDB system. The difference in stiffness between the conical bearings of the FDB system of an embodiment may be achieved through a variety of different approaches. In an embodiment, the upper and lower conical bearings may have different cone angles. A cone angle is the angle measured from the axis of the conical bearing to the lateral surface of the conical bearing. By changing the cone angle of a conical bearing, the bearing stiffness of the conical bearing may be adjusted. Similarly, the cone diameter of a conical bearing may also be adjusted to produce a desired change in the bearing stiffness of a conical bearing. Naturally, these approaches may be used individually, or in combination, so that each conical bearing of the FDB system has a desired stiffness.

In another embodiment, the lubricant or fluid used within a fluid dynamic bearing may be designed to have a viscosity which results in a desired bearing stiffness ratio between the upper and lower conical bearings. To illustrate, an upper conical bearing may use a lubricant or fluid having a different viscosity than the lubricant used with the lower conical bearing. Alternatively, either the upper conical bearing or the lower conical bearing may change the temperature of the same lubricant or fluid to adjust the viscosity of the lubricant or fluid to configure the stiffness of that conical bearing. Using a lubricant or fluid with a certain viscosity may be, but need not be, performed in concert or conjunction with one or more of adjusting the cone angle or the cone diameter of a conical bearing to realize a desired stiffness in the conical bearing.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a fluid dynamic bearing (FDB) system that supports a greater disparity in the bearing stiffness between the conical bearings of the FDB system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 5:
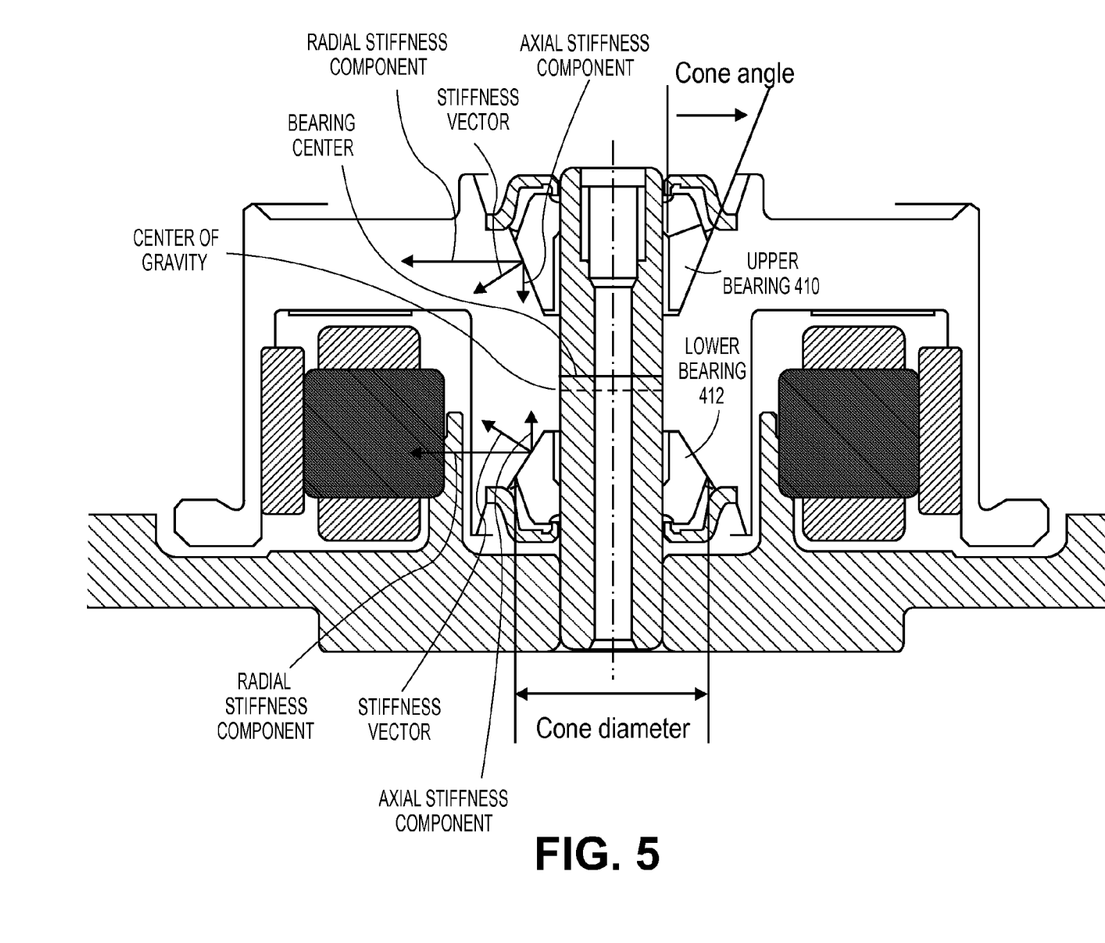
FIG. 5 is a diagram of the stiffness vectors produced by conical bearings of an embodiment of the invention.

A fluid dynamic bearing (FDB) system according to embodiments of the invention supports a greater disparity in the bearing stiffness between the conical bearings of the FDB system. FIG. 5 is a diagram that shows the bearing stiffness produced by conical bearings according to embodiments of the invention. As shown in FIG. 5, upper bearing 410 and lower bearing 412 each produce a stiffness force perpendicular to the lateral surface of the bearing. The stiffness force (or vector) may be decomposed into an axial stiffness component and a radial stiffness component as shown in FIG. 5. Embodiments of the invention support a greater disparity in the radial stiffness between conical bearings of a FDB system.

The fluid dynamic bearing (FDB) system of embodiments may be used in conjunction with any type of spindle motor system. For purposes of providing a concrete example, particular embodiments of the invention shall be described with reference to a hard-disk drive (HDD) using a tied-shaft spindle motor.

Figure 2:
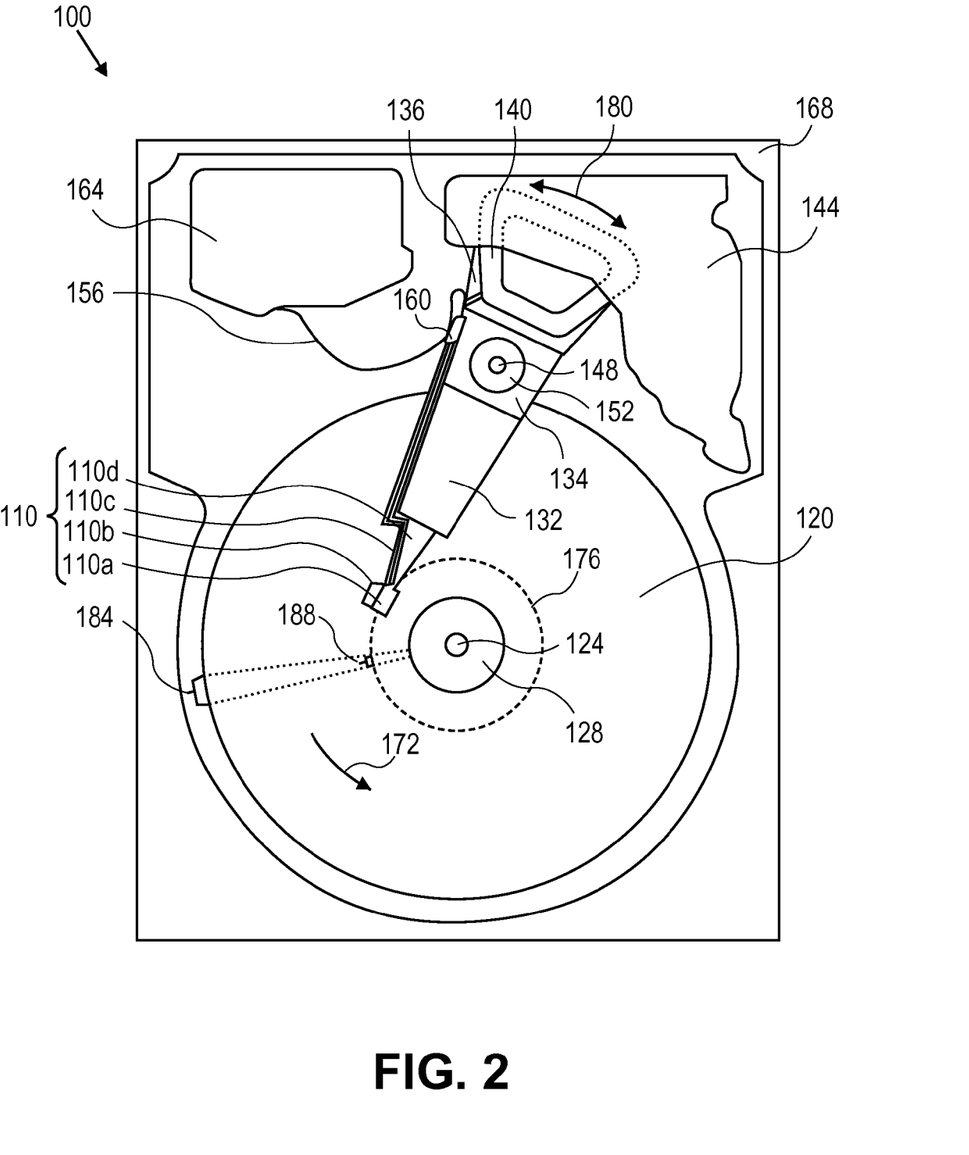
FIG. 2 is a plan view of an HDD according to an embodiment of the invention.

In accordance with an embodiment of the invention, a plan view of a HDD 100 is shown in FIG. 2. FIG. 2 illustrates the functional arrangement of components of the HDD including a slider 110b that includes a magnetic-recording head 110a. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 2, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 2, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110*b* including the head 110*a*.

Figure 3:
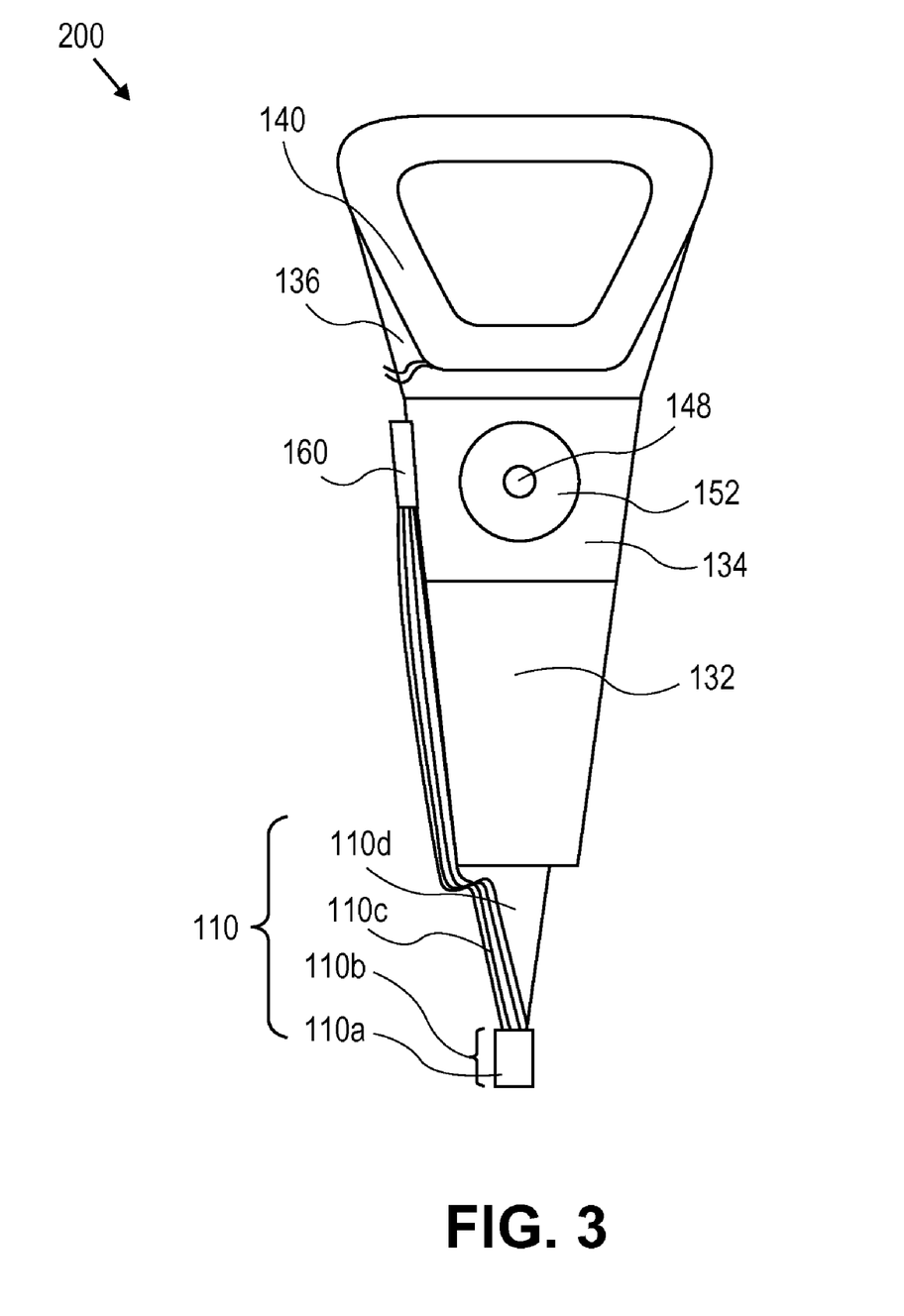
FIG. 3 is a plan view of a head-arm-assembly (HAA) according to an embodiment of the invention.

With reference now to FIG. 3, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110*b* including the head 110*a*. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Adjusting the Stiffness of a Fluid Dynamic Bearing

It may be desirable for a fluid dynamic bearing (FDB) system to support a wide disparity in the bearing stiffness, and in particular the radial bearing stiffness, between the conical bearings of the FDB system. As used herein, the bearing center of a FDB system is the middle point in the distance between the two conical bearings of the FDB system. The distance between the two conical bearings may be determined by measuring the distance between the ends of the two bearings in a direction parallel to the stationary shaft of the FDB system. The bearing center of a FDB system is depicted in FIG. 5. If the bearing center of the upper and lower conical bearings is a sufficient distance away from the center of gravity of the HDD, then when the disks in the HDD experience radial motion, the disks will experience a different responsive dampening movement from each side of the bearing, which will tend to prolong or increase the time in which the disks oscillate. Therefore, it would be advantageous to configure the stiffness of the conical bearings so that the disks receive a similar dampening movement in response to any radial motion by the disks. Providing a similar dampening movement form each side of the bearing will stabilize the disk and discourage or minimize angular motion.

Embodiments of the invention provide for a fluid dynamic bearing (FDB) system that supports a greater range of difference in the bearing stiffness, and in particular the radial bearing stiffness, between the conical bearings of the FDB system. For example, in embodiments, either the upper conical bearing or the lower conical bearing may be at least twice as stiff as the other. A FDB system that supports a greater range of difference in the bearing stiffness between the conical bearings is beneficial in systems with a small form factor or which have a center or gravity that is not near the bearing center of the FDB system.

The difference in stiffness between the conical bearings of the FDB system may be achieved through a variety of different approaches by embodiments. Embodiments may customize the bearing stiffness, and in particular the radial bearing stiffness, between conical bearings of a FDB system by adjusting a factor that contributes to the overall bearing stiffness. For example, the bearing stiffness may be affected by adjusting one or more of: (a) the cone angle of the bearing, (b) the height of the bearing, (c) the length of the gap between the bearing and the stationary shaft, and (d) the viscosity of the lubricant. Generally speaking, the stiffness of a conical bearing increases with (a) an increase in the cone angle of the bearing, (b) an increase in the height of the bearing, (c) a reduction in the length of the gap between the bearing and the stationary shaft, and (d) an increase in the viscosity of the lubricant used with the bearing.

Figure 4A:
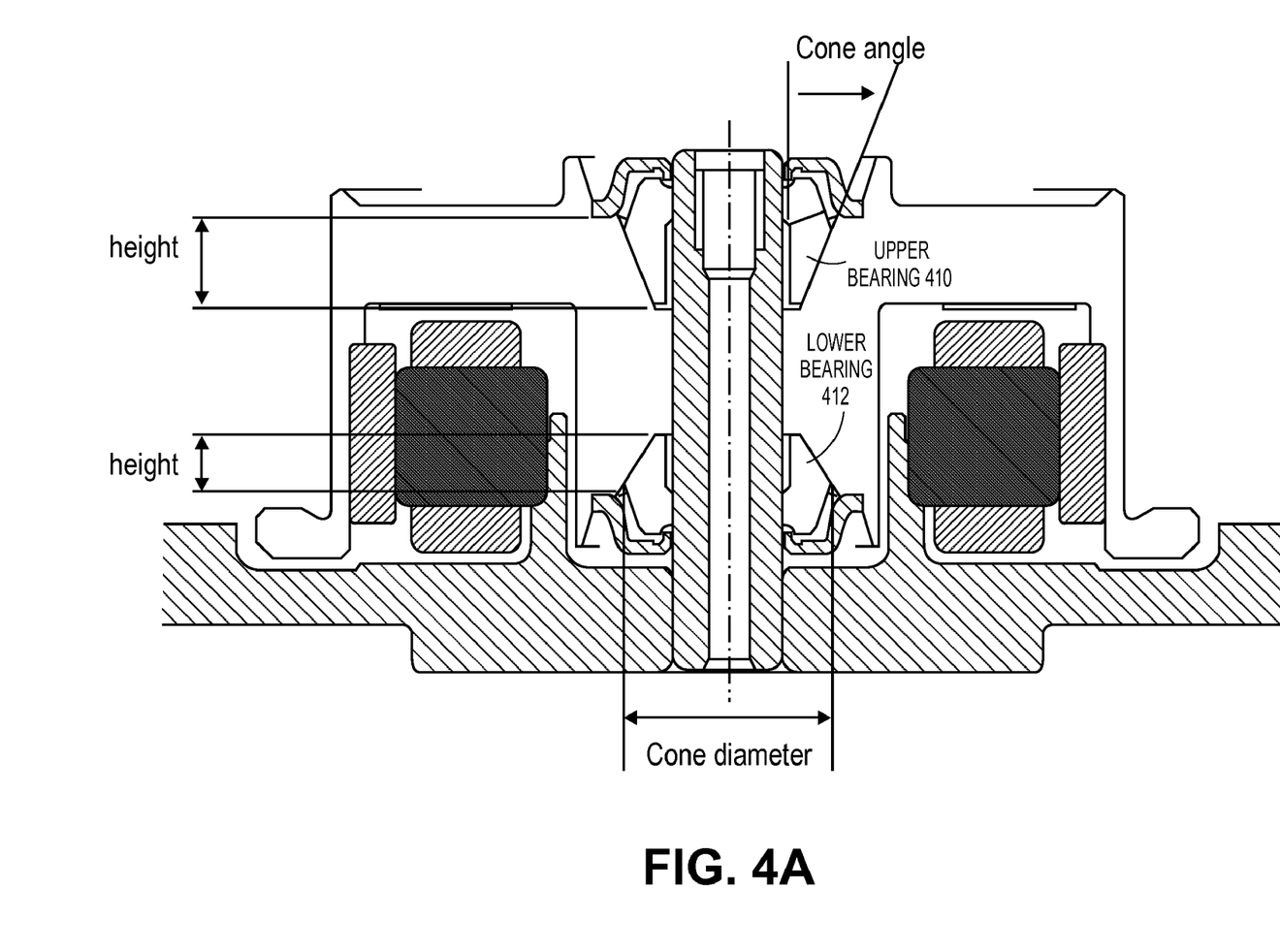
FIG. 4A is a diagram of a fluid dynamic bearing (FDB) system according to one embodiment of the invention.

FIG. 4A is a diagram of a fluid dynamic bearing (FDB) system according to one embodiment of the invention. As depicted in FIG. 4A, upper conical bearing 410 and lower conical bearing 412 have different cone angles. A cone angle is the angle measured from the axis of the conical bearing to the lateral surface of the conical bearing. As shown in FIG. 4A, lower conical bearing 412 has a greater cone angle than upper conical bearing 410.

By changing the cone angles of a conical bearing and keeping all other factors the same, the bearing stiffness of the conical bearing may be increased. Generally, the wider the cone angle, the stiffer a conical bearing will be.

Figure 4B:
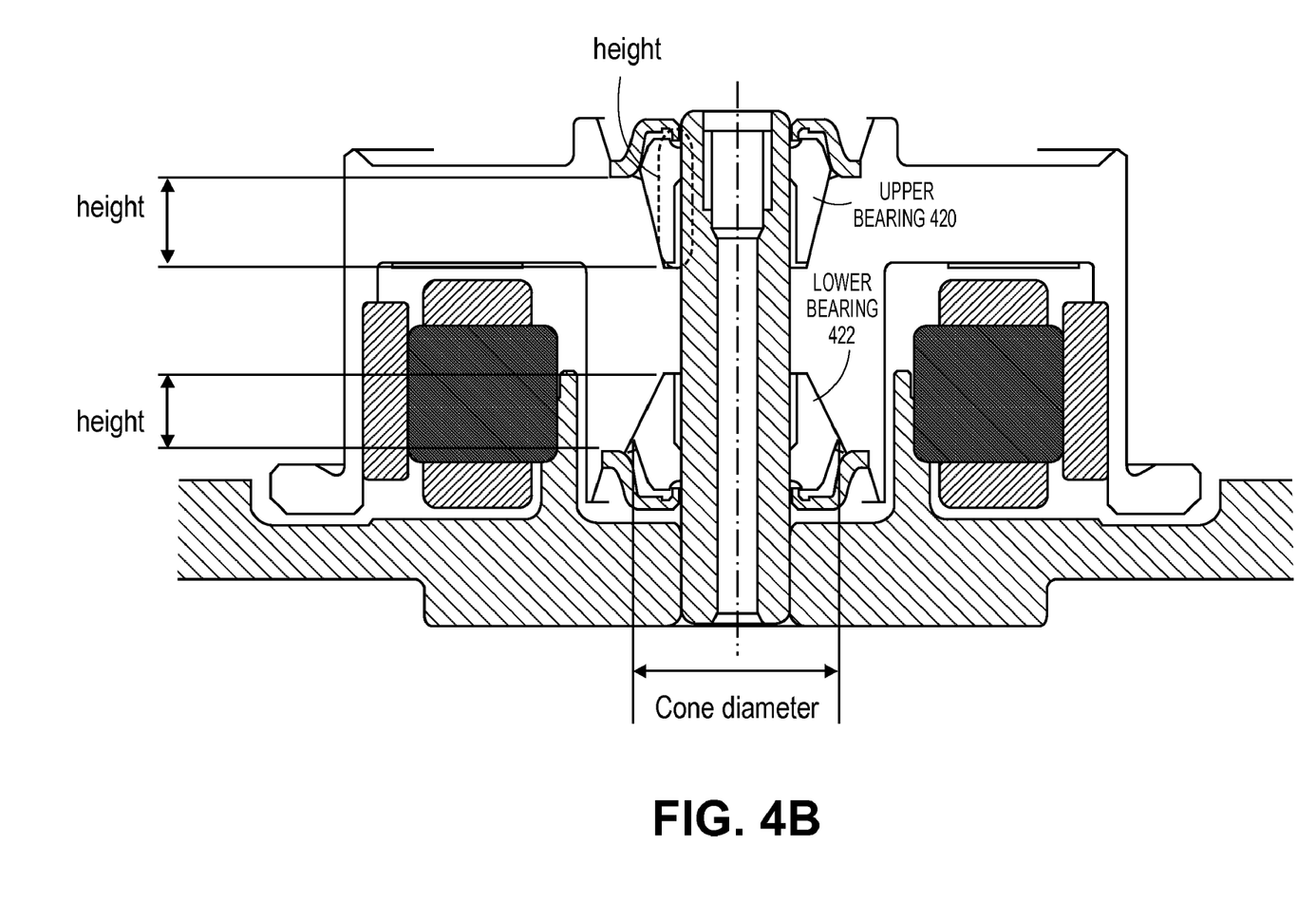
FIG. 4B is a diagram of a fluid dynamic bearing (FDB) system according to another embodiment of the invention.

There are different ways in which the cone angle of a conical bearing may be changed. For example, FIG. 4A depicts an embodiment where the cone angle is adjusted by changing the height of the conical bearings, but the cone diameter of conical bearings 410 and 412 are the same. In this context, the term cone diameter refers to the length of the base of the conical bearing. The cone angle may also be adjusted by changing the cone diameter rather than the height of the conical bearing. To illustrate this approach, consider FIG. 4B, which is a diagram of a fluid dynamic bearing (FDB) system according to another embodiment of the invention. As shown in FIG. 4B, upper bearing 420 and lower bearing 420 have the same height, but have different cone angles and cone diameters.

In another embodiment, the lubricant used with a conical bearing of the FDB system may be designed to have a viscosity which results in a desired stiffness for the conical bearing. To illustrate, an upper conical bearing may use a lubricant having a different viscosity than the lubricant used with the lower conical bearing. Alternatively, either the upper conical bearing or the lower conical bearing may employer a heating apparatus to change the temperature of the lubricant. A change in the temperature in the lubricant will cause a change in the viscosity of the lubricant. A lubricant which is more viscous will be less stiff than a lubricant which is less viscous. Thus, by changing the temperature of the lubricant used in a conical bearing, the stiffness of the conical bearing may be configured. Using a lubricant with a certain viscosity may be, but need not be, performed in concert or conjunction with one or more of adjusting the opening angle or the height of a conical bearing to adjust the stiffness of the conical bearing.

Figure 4C:
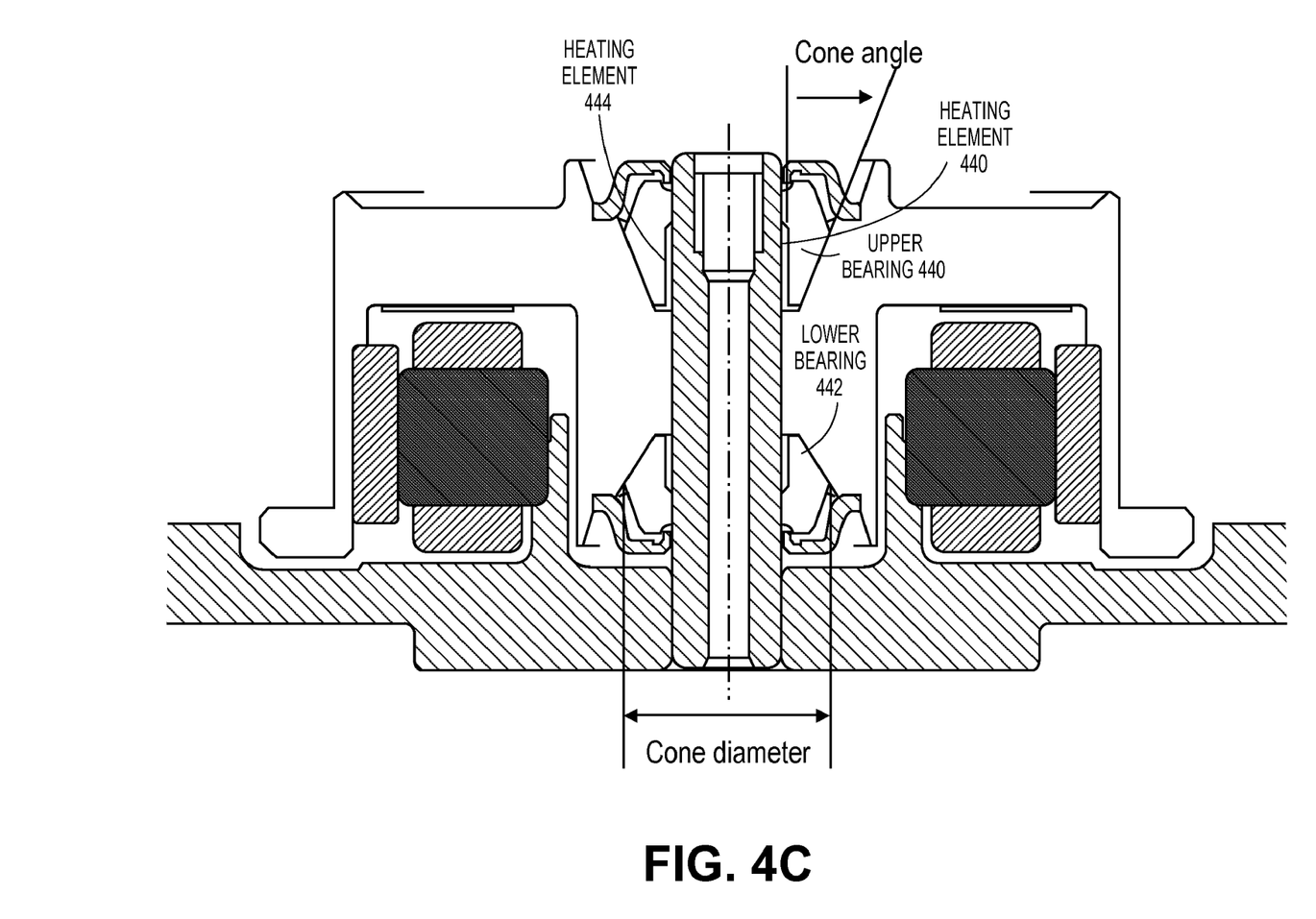
FIG. 4C is a diagram of a fluid dynamic bearing (FDB) system according to another embodiment of the invention.

FIG. 4C is a diagram of a fluid dynamic bearing (FDB) system according to such an embodiment of the invention. The viscosity of the lubricant is upper conical bearing 440 is different than the viscosity of the lubricant is lower conical bearing 442. Naturally, these approaches may be used individually, or in combination, so that each conical bearing of the FDB system has a desired stiffness. One bearing or more bearings may include a heating element to heat the lubricant, e.g., FIG. 4C depicts heating element 444 to heat the lubricant used with upper bearing 440. Heating the lubricant used with upper bearing 440 will cause upper bearing 440 to be less stiff (including a lower radial stiffness) than lower bearing 442.

Embodiments may also use two or more of the above techniques to adjust the difference in bearing stiffness in the conical bearing of the FDB system. To illustrate, embodiments may employ an upper conical bearing and a lower conical bearing that have (a) different cone angles and (b) different cone diameters to produce a desired bearing stiffness ratio between the upper conical bearing and the lower conical bearing.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   an enclosure;
   a magnetic-recording head;
   a magnetic-recording disk rotatably mounted on a stationary shaft; and
   a fluid dynamic bearing (FDB) system that comprises an upper conical bearing and a lower conical bearing that are both disposed along the stationary shaft,
   wherein the upper conical bearing and the lower conical bearing have different cone angles, wherein a cone angle is the angle measured from the axis of a conical bearing to the lateral surface of the conical bearing, and
   wherein the cone angles of the upper conical bearing and the lower conical bearing produce a desired bearing stiffness ratio between the upper conical bearing and the lower conical bearing.

2. The hard-disk drive of claim 1, wherein the desired bearing stiffness ratio is 2.0 or greater.

3. The hard-disk drive of claim 1, wherein the desired bearing stiffness ratio is determined, based at least in part, on the distance between (a) the bearing center of the lower conical bearing and the upper conical bearing, and (b) a center of gravity of the hard-disk drive.

4. The hard-disk drive of claim 1, wherein the cone diameter of the upper conical bearing and the lower conical bearing is the same length.

5. The hard-disk drive of claim 1, wherein the cone diameter of the upper conical bearing and the lower conical bearing is a different length.

6. The hard-disk drive of claim 1, wherein a first lubricant is used with the upper conical bearing, wherein a second lubricant is used with the lower conical bearing, wherein the second lubricant has a different viscosity than the first lubricant, and wherein the viscosity of the first lubricant and the viscosity of the second lubricant assist in desired bearing stiffness ratio between the upper conical bearing and the lower conical bearing.

7. The hard-disk drive of claim 6, wherein the viscosity of either the first lubricant or the second lubricant is adjusted by heating the lubricant.

8. A persistent storage medium, comprising:
   an enclosure;
   a recording head;
   a recording disk rotatably mounted on a stationary shaft; and
   a fluid dynamic bearing (FDB) system that comprises an upper conical bearing and a lower conical bearing that are both disposed along the stationary shaft,
   wherein the upper conical bearing and the lower conical bearing have (a) different cone angles and (b) different cone diameters,
   wherein a cone angle is the angle measured from the axis of a conical bearing to the lateral surface of the conical bearing, and
   wherein the cone angles and the cone diameters of the upper conical bearing and the lower conical bearing produce a desired difference in stiffness between the upper conical bearing and the lower conical bearing.

9. The persistent storage medium of claim 8, wherein the desired difference in stiffness is a ratio of 2.0 or greater.

10. The persistent storage medium of claim 8, wherein the desired bearing stiffness ratio is determined, based at least in part, on the distance between (a) the bearing center of the lower conical bearing and the upper conical bearing, and (b) a center of gravity of the hard-disk drive.

11. The persistent storage medium of claim 8, wherein a first lubricant is used with the upper conical bearing, wherein a second lubricant is used with the second conical bearing, wherein the second lubricant has a different viscosity than the first lubricant, and wherein the viscosity of the first lubricant and the viscosity of the second lubricant assist in achieving the desired bearing stiffness ratio between the upper conical bearing and the lower conical bearing.

12. The persistent storage medium of claim 11, wherein the viscosity of either the first lubricant or the second lubricant is adjusted by heating the lubricant.

13. A hard-disk drive, comprising:
   an enclosure;
   a magnetic-recording head;
   a magnetic-recording disk rotatably mounted on a stationary shaft; and
   a fluid dynamic bearing (FDB) system that comprises an upper conical bearing and a lower conical bearing that are both disposed along the stationary shaft,
   wherein a first lubricant is used with the upper conical bearing, wherein a second lubricant is used with the lower conical bearing, wherein the second lubricant has a different viscosity than the first lubricant, and
   wherein the viscosity of the first lubricant and the viscosity of the second lubricant produce a desired difference in stiffness between the upper conical bearing and the lower conical bearing.

14. The hard-disk drive of claim 13, wherein the viscosity of either the first lubricant or the second lubricant is adjusted by heating the lubricant.

15. The hard-disk drive of claim 13, wherein the desired difference in stiffness is a ratio of 2.0 or greater.

16. The hard-disk drive of claim 13, wherein the desired difference in stiffness is determined, based at least in part, on the distance between (a) the bearing center of the lower conical bearing and the upper conical bearing, and (b) a center of gravity of the hard-disk drive.

17. The hard-disk drive of claim 13, wherein the cone diameter of the upper conical bearing and the lower conical bearing is the same length.

18. The hard-disk drive of claim 13, wherein the cone diameter of the upper conical bearing and the lower conical bearing is a different length.

* * * * *